United States Patent [19]

Ando

[11] Patent Number: 4,807,810
[45] Date of Patent: Feb. 28, 1989

[54] HUMIDIFICATION CONTROLLING SYSTEM WITH AN ULTRASONIC HUMIDIFIER

[75] Inventor: Iwao Ando, Hachioji, Japan

[73] Assignee: Yukyan Kabushiki Kaisha, Tokyo, Japan

[21] Appl. No.: 59,070

[22] Filed: Jun. 8, 1987

[30] Foreign Application Priority Data

Feb. 24, 1987 [JP] Japan .................................. 62-40568

[51] Int. Cl.$^4$ ............................................... B01F 3/02
[52] U.S. Cl. ........................... 236/44 A; 261/DIG. 48; 310/314
[58] Field of Search ............... 236/44 R, 4 AA, 44 E, 236/46 F, 78 D; 310/314; 261/DIG. 48, 81; 239/102; 318/118

[56] References Cited

U.S. PATENT DOCUMENTS

| | | | |
|---|---|---|---|
| 3,114,091 | 12/1963 | Edwards | 318/118 |
| 3,490,697 | 1/1970 | Best, Jr. | 261/DIG. 48 |
| 3,743,868 | 7/1973 | Kawada | 318/118 |
| 4,029,064 | 6/1977 | Csaszar et al. | 261/DIG. 48 |

FOREIGN PATENT DOCUMENTS 0159535 8/1985 Japan .................................. 236/44 E

OTHER PUBLICATIONS

Mini-And Microcomputer Control in Industrial Processes Skrokov, 1982, p. 82.
Control Engineers Handbook, Truxal, 1958, pp. 6-12, 6-13.
Process Instruments and Controls Handbook, Considine, 1958, pp. 11-26.

Primary Examiner—William E. Wayner
Attorney, Agent, or Firm—Bauer & Schaffer

[57] ABSTRACT

The humidity within a controlled chamber is detected with a humidity detector, the proportional value, integrated value and differentiated value of the difference between the detected signal and a preset objective value signal are added to be an operation amount signal and an oscillator of an ultrasonic humidifier is oscillated with an amplitude adjusted in response to this operation amount signal to keep the humidity within the controlled chamber constant.

1 Claim, 6 Drawing Sheets

HUMIDIFICATION CONTROLLING SYSTEM WITH AN ULTRASONIC HUMIDIFIER

FIELD OF THE INVENTION

This invention relates to a humidification controlling system for keeping the humidity within a controlled chamber at a fixed objective value by using an ultrasonic humidifier.

By the way, the above mentioned controlled chamber means a space in which the humidity is to be controlled.

BACKGROUND OF THE INVENTION

Heretofore, in the case of keeping the humidity within a controlled chamber constant by using an ultrasonic humidifier, the humidity within the controlled chamber has been controlled by such ON-OFF-operations as are shown in FIG. 6.

That is to say, as shown in FIG. 6, an ON-humidity $H_{ON}$ and OFF-humidity $H_{OFF}$ having a hysteresis $\Delta H$ for a objective humidity $H_O$ are determined, the humidity within the controlled chamber is detected with a humidity detector, at the time points $t_1$ and $t_3$ when the detected humidity H reaches the OFF-humidity $H_{OFF}$ while rising, the oscillation of the oscillator of the ultrasonic humidifier is perfectly stopped and, at the time points $t_2$ and $t_4$ when the above mentioned detected humidity H reaches the ON-humidity while lowering, the oscillator of the ultrasonic humidifier is oscillated with an amplitude of 100%.

By the way, in the case shown in FIG. 6, the detected humidity H at the control starting time point $t_0$ is so low that the oscillator of the ultrasonic humidifier oscillates with an amplitude of 100%.

However, as the place of setting the ultrasonic humidifier and the place of setting the humidity detector are usually separated from each other, the time of transmitting air humidified by spray is comparatively long and the time of being sensed by the humidity detector itself can not be neglected. Therefore, that is to say, in the humidification controlling system, the transmission delay and wasted time are generally so large that, with the above mentioned conventional humidification controlling system, there have been defects that, as shown in FIG. 6, an overshoot $\Delta A$ and undershoot $\Delta B$ will be generated, therefore a cycling (continued oscillation) of a large amplitude will occur and the humidity within the controlled chamber will not be able to be precisely kept constant.

Also, in the above mentioned conventional humidification controlling system, as described above, the hysteresis $\Delta H$ is provided to somewhat reduce the frequency of the ON-OFF-operations (the oscillation of 100% amplitude and the perfect stop of the oscillation) of the oscillator of the ultrasonic humidifier. However, the precision will be further reduced by the part of the hysteresis $\Delta H$, therefore the hysteresis will not be able to be made so large and therefore the above mentioned oscillator will be so high in the ON-OFF frequency as to be likely to be broken.

BRIEF SUMMARY OF THE INVENTION

The present invention has it as an object to provide a humidification controlling system with an ultrasonic humidifier whereby the humidity within a controlled chamber can be stably and higher precisely kept at a fixed objective value without causing a cycling or offset and can be amended within a short time even in such case an external turbulence is applied as in case the door of the controlled chamber is opened and closed and the oscillator of the humidifier is not likely to be broken.

Therefore, in the present invention, the humidity within the controlled chamber is detected with a humidity detector and the proportional value, integrated value and differentiated value of the difference between the detected signal and the preset objective value signal are added to be an operation amount signal and the oscillator of the ultrasonic humidifier is oscillated with an amplitude adjusted in response to this operation amount signal to keep the humidity within the controlled chamber constant.

Now, the sprayed amount per unit time (which shall be referred to merely as the "sprayed amount" hereinafter) from the ultrasonic humidifier varies with the ultrasonic energy generated by the oscillation of the oscillator of the ultrasonic humidifier, this ultrasonic energy is proportional to the square of the amplitude of the above mentioned oscillator and therefore, by varying the amplitude of the oscillator of the ultrasonic humidifier, the sprayed amount from the ultrasonic humidifier can be continuously varied from 0 to 100%.

Therefore, according to the present invention, as the amplitude of the oscillator of the ultrasonic humidifier is adjusted in response to the operation amount signal, a sprayed amount in response to the operation amount signal will be generated from the ultrasonic humidifier.

Further, in the present invention, as the humidity within the controlled chamber is detected with the humidity detector and the proportional value, integrated value and differentiated value of the difference between the detected signal and the preset objective value signal are added to be the above mentioned operation amount signal, a control by a PID operation in which the humidity within the controlled chamber is made a controlled amount and the sprayed amount from the ultrasonic humidifier is made an operation amount will be realized.

Therefore, according to the present invention, there are advantages that, though the time of transmitting air humidified by spraying is comparatively long and the sensing time of the humidity detector itself can not be neglected, that is, though the transmission delay and wasted time are large, the humidity within the controlled chamber can be stably and highly precisely kept at a fixed objective value without causing a cycling or offset and can be amended within a short time even in such case an external turbulence is applied as in case the door of the controlled chamber is opened and closed.

Further, according to the present invention, there are advantages that, as described above, the amplitude of the oscillator of the ultrasonic humidifier is adjusted in response to the above mentioned operation amount signal and the oscillator of the ultrasonic humidifier is not ON and OFF (oscillated with 100% amplitude and perfectly stopped in oscillating) so frequently as in the conventional humidification controlling system and therefore is not likely to be broken.

DETAILED DESCRIPTION OF THE INVENTION

Figure 1:
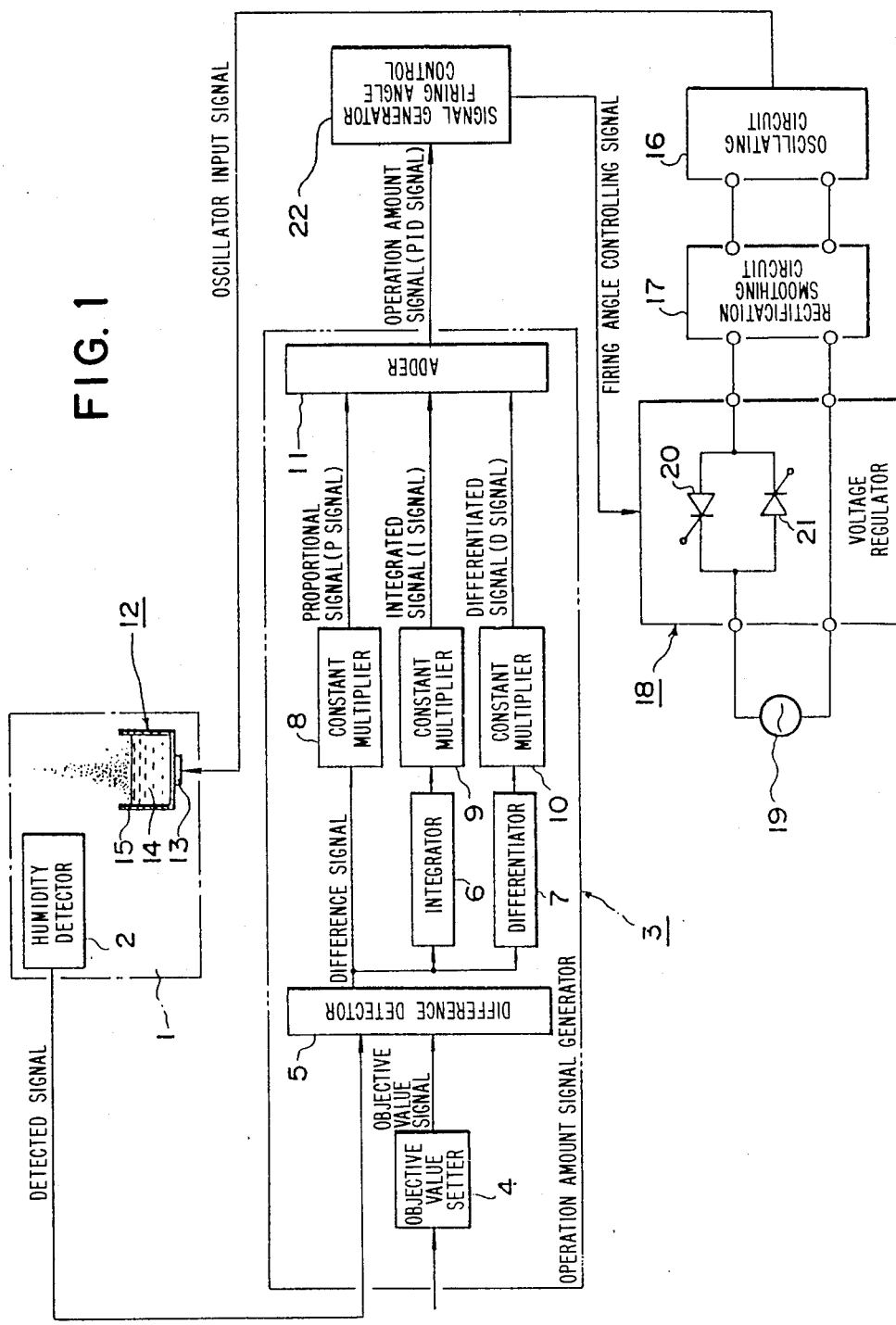
FIG. 1 is a formation view of an apparatus using a humidification controlling system of the present invention.

FIG. 1 is a formation view showing an example of an apparatus using a humidification controlling system of the present invention. The humidification controlling system of the present invention shall be explained with reference to this apparatus.

In FIG. 1, the reference numeral 1 represents a controlled chamber and 2 represents a humidity detector for detecting the humidity within the controlled chamber 1. For example, a high molecular weight humidity sensor can be used for this humidity detector 2.

In the present invention, the humidity within the controlled chamber 1 is detected with the above mentioned humidity detector 2 and the proportional value, integrated value and differentiated value of the difference between the detected signal and a preset objective value signal are added to be an operation amount signal.

In the case of the apparatus shown in FIG. 1, the detected signal from the above mentioned humidity detector 2 is put into an operation amount signal generator 3 and the above mentioned operation amount signal (PID signal) is put out of the operation amount signal generator. That is to say, as shown in FIG. 1, the above mentioned operation amount signal generator 3 is formed of an objective value setter 4, difference detector 5, integrator 6, differentiator 7, constant multipliers 8, 9 and 10 and adder 11. Therefore, when the user sets in advance an objective humidity within the controlled chamber 1 with the objective value setter 4, as the objective value signal from the objective value setter 4 and the detected signal from the humidity detector 2 have been put into the difference detector 5, the difference between the detected signal from the difference detector 5 and the preset objective value signal will be put out as a difference signal. This difference signal will be multiplied by a predetermined constant by the constant multiplier 8 and the proportional value of the above mentioned difference will be put as a proportional signal (P signal) into the adder 11. The above mentioned difference signal will be integrated by the integrator 6 and will be multiplied by a predetermined constant by the constant multiplier 9 and the integrated value of the above mentioned difference will be put as an integrated signal (I signal) into the adder 11. Further, the above mentioned difference signal will be differentiated by the difference signal will be differentiated by the differentiator 7 and will be further multiplied by a predetermined constant by the constant multiplier 10 and the differentiated value of the above mentioned difference will be put as a differentiated signal (D signal) into the adder 11. Therefore, the above mentioned proportional signal, integrated signal and differentiated signal will be added by the adder 11 and an operation amount signal (PID signal) of the sum of the proportional value, integrated value and differentiated value of the difference between the above mentioned detected signal and the preset objective value signal will be put out of the above mentioned adder 11.

Also, in the present invention, the oscillator 13 of the ultrasonic humidifier 12 is oscillated with an amplitude adjusted in response to the above mentioned operation amount signal to keep the humidity within the controlled chamber 1 constant at the objective value.

In the case of the apparatus shown in FIG. 1, the ultrasonic humidifier 12 is formed of a sprayed water tank 15 containing water 14 to be sprayed, the oscillator 13 fitted to the bottom of the sprayed water tank 15 and an oscillating circuit 16 adding as an oscillator input signal to the oscillator 13 an alternating current voltage of the same frequency as of the ultrasonic waves. By the way, a rectification smoothing circuit 17 is connected on the output side to the oscillating circuit 16, an alternating current source 19 is connected to the input side of the rectification smoothing circuit 17 through a voltage regulator 18 and a direct current voltage is put into the oscillating circuit 16.

By the way, the above mentioned alternating current source 19 is usually of AC 100 V or AC 200 V and is therefore reduced in the voltage to be of a required voltage through a transformer, as required.

Various kinds of the oscillating circuit 16 can be used. In the case shown in FIG. 1, an alternating current voltage of an amplitude corresponding to the size of the input direct current voltage and the same (constant) frequency as of the ultrasonic waves is to be put out as an oscillator input signal. In the case shown in FIG. 1, the above mentioned voltage regulator 18 is formed of a reverse parallel circuit of thyristors 20 and 21, a firing angle controlling signal from a firing angle controlling signal generator 22 is put into the gates of these thyristors 20 and 21 to determine a firing angle $\theta_f$ and an alternating current voltage from the alternating current source 19 is controlled in the firing angle, is regulated to be an alternating current of an effective value determined by the above mentioned firing angle $\theta_f$ and is put out. Therefore, when the size of the direct current voltage put into the oscillating circuit 16 in response to the above mentioned firing angle $\theta_f$ is determined and the firing angle varies from 0 to $\pi$, the size of the direct current voltage put into the oscillating circuit will vary from 0 to 100%.

By the way, in the case of the embodiment shown in the drawing, as the alternating current voltage is controlled in the firing angle with the voltage regulator 18 as mentioned above, noise will be generated so often that the transistors or the like forming the oscillating circuit 16 will be likely to be destroyed. Therefore, in fact, such noise absorbing means as a noise cutting transformer is provided between the voltage regulator 18 and rectification smoothing circuit 17.

In the case of the apparatus shown in FIG. 1, the above mentioned operation amount signal is put into the firing angle controlling signal generator 22 so that the firing angle controlling signal may be adjusted on the basis of the operation amount signal. That is to say, the higher the level of the operation amount signal, the smaller the above mentioned firing angle $\theta_f$. The lower the level, the larger the firing angle $\theta_f$. Therefore, in response to the operation amount signal, the size of the direct current voltage put into the oscillating circuit 16 will be adjusted and the amplitude of the oscillator input signal put out of the oscillating circuit 16 will be adjusted and thereby, in response to the operation amount signal, the amplitude of the oscillation of the oscillator 13 of the ultrasonic humidifier 12 will be adjusted.

Now, as the sprayed amount from the ultrasonic humidifier 12 varies with the ultrasonic energy generated by the oscillation of the oscillator 13 of the ultrasonic humidifier 12 and this ultrasonic energy is proportional to the square of the amplitude of the above mentioned oscillator 13, by varying the amplitude of the oscillator 13 of the ultrasonic humidifier 12, the sprayed amount from the ultrasonic humidifier 12 can be continuously varied from 0 to 100%.

Figure 2:
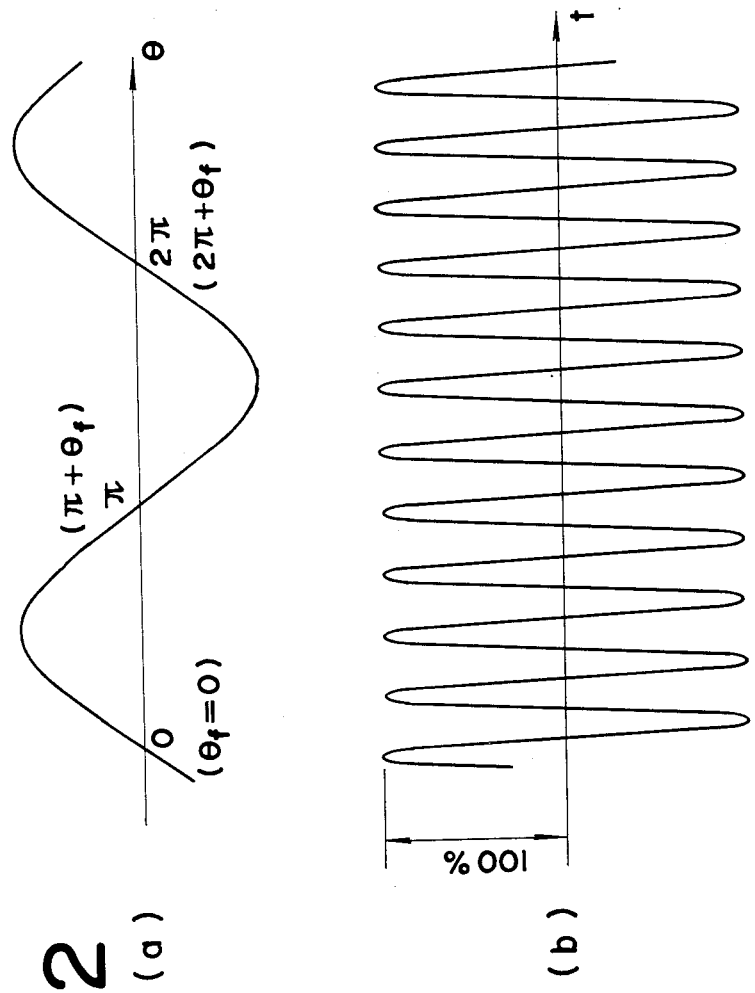
FIGS. 2a, 2b, 3a, 3b, 4a and 4b show operating states in respective sprayed amounts, (a) being an output voltage waveform diagram of a voltage regulator and (b) being a waveform diagram of an oscillator input signal.
Figure 3:
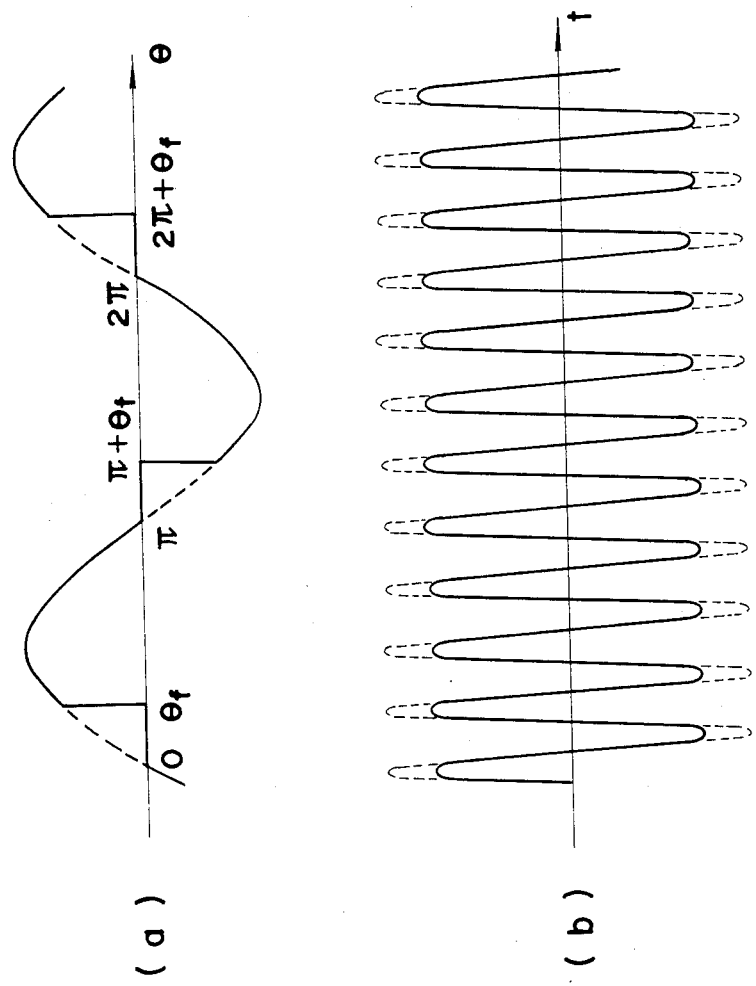
Figure 4:
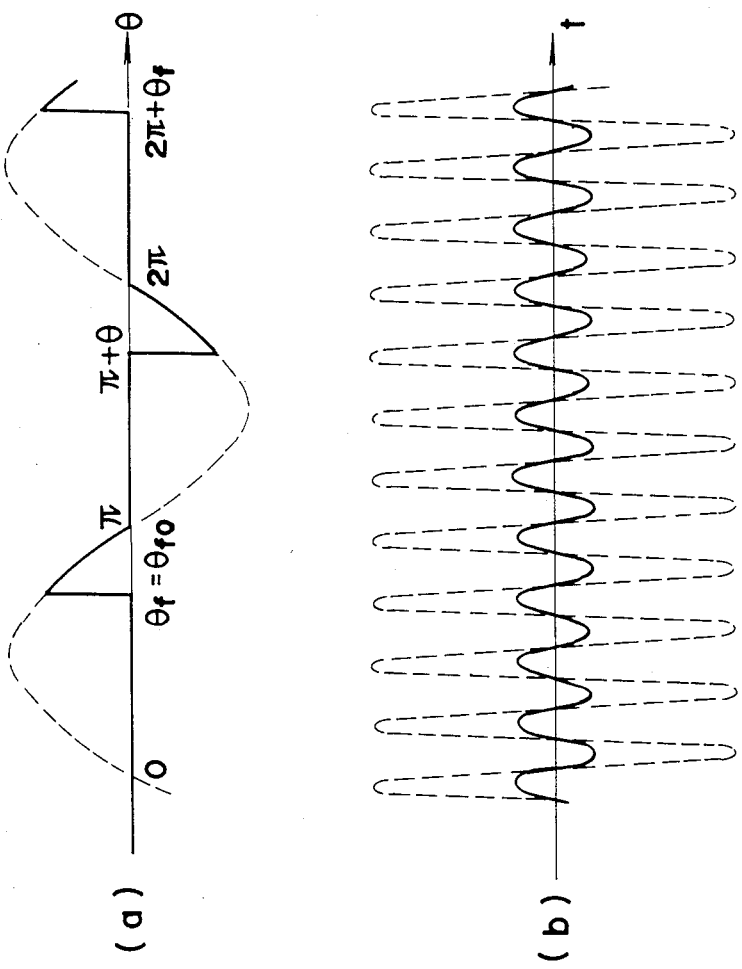

By the way, FIG. 2 shows the state that the sprayed amount from the ultrasonic humidifier 12 is 100%. FIG. 3 shows the state that the sprayed amount is reduced. FIG. 4 shows the state of 0%. In these diagrams, (a) is a waveform diagram of the output voltage of the voltage regulator 18 and (b) is a waveform diagram of the oscillator input signal put into the oscillator 13. That is to say, in the case of FIG. 2, the above mentioned firing angle 0 is made of $\theta_f$ so that the size of the direct current voltage put into the oscillating circuit 16 will be 100%, the amplitude of the oscillator input signal will be 100% and the above mentioned sprayed amount will be 100%.

Further, in the case of FIG. 3, the above mentioned firing angle $\theta_f$ is made somewhat larger so that the size of the direct current voltage put into the oscillating circuit 16 will be somewhat smaller, the amplitude of the oscillator input signal will be also somewhat smaller and the above mentioned sprayed amount will be smaller. Further, in the case of FIG. 4, the above mentioned firing angle $\theta_f$ is made a critical angle $\theta_{fo}$ so that the direct current voltage put into the oscillating circuit 16 will be smaller, the amplitude of the oscillator input signal will be also smaller and the above mentioned sprayed amount will be just 0%.

By the way, the above mentioned critical angle $\theta_{fo}$ is such angle that the spray will not be generated from the ultrasonic humidifier 12 when the above mentioned firing angle $\theta_f$ is made larger than it but will be generated when the firing angle $\theta_f$ is made smaller than it. This critical angle $\theta_{fo}$ is based on such property that, even if the ultrasonic energy is applied to water 14 within the sprayed water tank 15 by oscillating the oscillator 13 of the ultrasonic humidifier 12, the ultrasonic energy will not be above a predetermined level. Therefore, in the case of the apparatus shown in FIG. 1, if the firing angle $\theta_f$ is varied from 0 to $\theta_{fo}$, the sprayed amount from the ultrasonic humidifier 12 will be able to be continuously varied from 0 to 100%.

Therefore, according to the above mentioned present invention, as the amplitude of the oscillator 13 of the ultrasonic humidifier 12 is adjusted in response to the operation amount signal, a sprayed amount in response to the operation amount signal will be generated from the ultrasonic humidifier 12.

Further, in the present invention, as the humidity within the controlled chamber 1 is detected with the humidity detector 2 and the proportional value, integrated value and differentiated value of the difference between the detected signal and the preset objective value signal are added to be the above mentioned operation amount signal, a control by a PID operation in which the humidity within the controlled chamber 1 is made a controlled amount and the sprayed amount from the ultrasonic humidifier 12 is made an operation amount will be realized.

Figure 5:
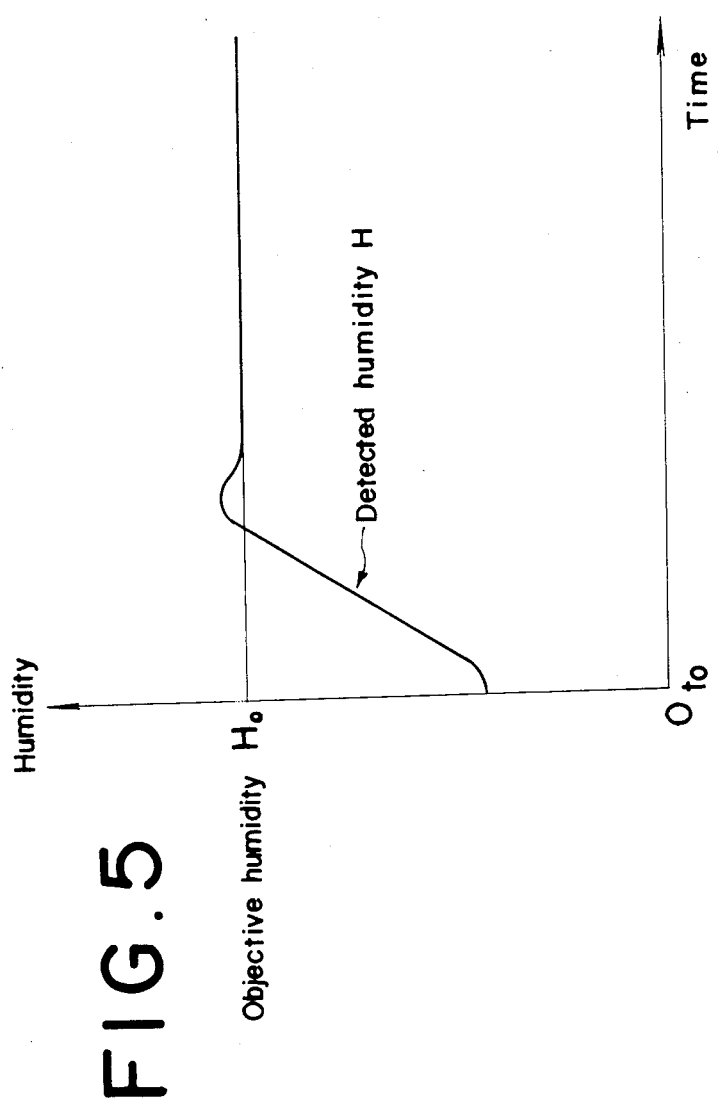
FIG. 5 is a diagram showing the relationship between the time lapse and humidity by the humidity controlling system of the present invention.
Figure 6:
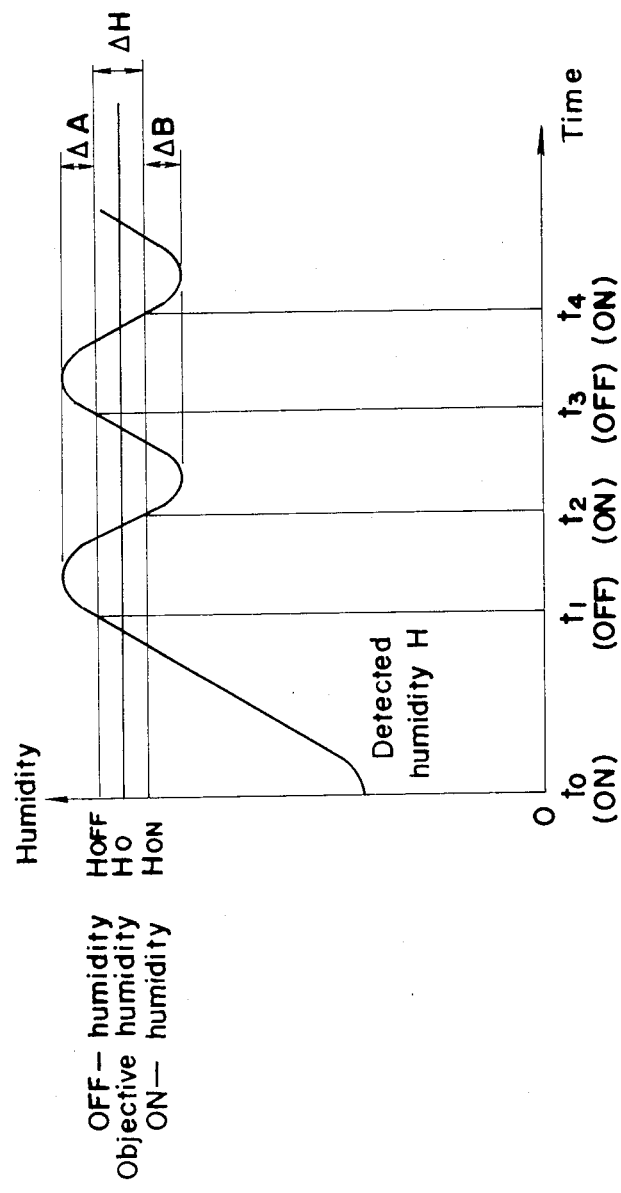
FIG. 6 is a diagram showing the relationship between the time lapse and humidity by a conventional humidification controlling system.

Therefore, according to the present invention, there are advantages that, though the time of transmitting air humidified by spraying is comparatively long and the sensing time of the humidity detector 2 itself can not be neglected, that is, though the transmission delay and wasted time are large, as in FIG. 5, the humidity within the controlled chamber can be stably and highly precisely kept at a fixed objective value without causing a cycling or offset and can be amended within a short time even in such case an external turbulence is applied as in case the door of the controlled chamber is opened and closed.

Further, according to the present invention, there are advantages that, as described above, the amplitude of the oscillator of the ultrasonic humidifier is adjusted in response to the above mentioned operation amount signal and the oscillator of the ultrasonic humidifier is not ON and OFF (oscillated with 100% amplitude and perfectly stopped in oscillating) so frequently as in the conventional humidification controlling system and therefore is not likely to be broken.

By the way, in the above explanation, it is meant that, once the objective humidity within the controlled chamber is set, it will not vary. However, the objective value can be varied with the lapse of time, for example, by giving a controlling signal to the object value setter 4 from outside.

As described in detail in the above, according to the present invention, there are obtained effects that the humidity within the controlled chamber can be stably and highly precisely kept at a fixed objective value without causing a cycling or offset and can be amended within a short time even in such case an external turbulence is applied as in case the door of the controlled chamber is opened and closed and that the oscillator of the ultrasonic humidifier is not likely to be broken.

What is claimed is:

1. A system for controlling the humidity within a chamber comprising an ultrasonic humidifier positioned in said chamber, a constantly operating oscillator associated with said ultrasonic humidifier within said chamber, a humidity detector located in said chamber for sensing the level of humidity therein and thereby producing a detected signal, means to provide a preset objective value signal, means responsive to the sum of the proportional value, the integrated value and the differentiated value of the difference between said detected signal and said preset objective value signal to generate an operation amount signal, and means to convert said operation amount signal to an oscillator input signal for continual adjustment of the amplitude of the oscillator associated with said ultrasonic humidifier in response to variations in said operation amount signal to cause said oscillator to maintain the humidity within the chamber constant.

* * * * *